United States Patent [19]

Hiraiwa

[11] Patent Number: 4,658,663
[45] Date of Patent: Apr. 21, 1987

[54] SYNCHROMESH TRANSMISSION SUITED FOR USE AS AUTOMOTIVE AUTOMATIC TRANSMISSION

[75] Inventor: Kazuyoshi Hiraiwa, Atsugi, Japan

[73] Assignee: Nissan Motor Co., Ltd., Yokohama, Japan

[21] Appl. No.: 709,642

[22] Filed: Mar. 8, 1985

[30] Foreign Application Priority Data

Mar. 30, 1984 [JP] Japan .................................. 59-60988

[51] Int. Cl.⁴ .............................................. F16H 3/08
[52] U.S. Cl. ........................................ 74/359; 74/330; 74/356
[58] Field of Search ................ 74/330, 331, 329, 356, 74/358, 359

[56] References Cited

U.S. PATENT DOCUMENTS

| 3,691,861 | 9/1972 | Stürmer ................................. 74/330 |
| 4,485,687 | 12/1984 | Burke et al. ......................... 74/358 |
| 4,513,631 | 4/1985 | Koivunen ............................. 74/331 |

FOREIGN PATENT DOCUMENTS 58-118355  7/1983  Japan .

Primary Examiner—Allan D. Herrmann
Attorney, Agent, or Firm—Schwartz, Jeffery, Schwaab, Mack, Blumenthal & Evans

[57] ABSTRACT

A countershaft synchromesh type transmission is arranged to have primary and secondary groups of intermeshing input and output gears which are designed to selectively provide between the input shaft and the countershaft a common (third) speed change ratio. With this, the structures for supporting the gears can be simple.

10 Claims, 2 Drawing Figures

SYNCHROMESH TRANSMISSION SUITED FOR USE AS AUTOMOTIVE AUTOMATIC TRANSMISSION

BACKGROUND OF THE INVENTION

1. Field of the Invention

The present invention relates in general to a countershaft synchromesh type transmission and more particularly to an improved arrangement suited for use as an automotive automatic transmission.

2. Description of the Prior Art

"Automotive Engineering" June 1980 pages 87 and 88 shows a synchromesh type transmission which performs so called "hot shifts" between gears by setting synchronizers and selectively engaging and disengaging first and second clutches. However, this transmission has suffered from the drawback that the sequential 1-2-3-4-5 etc., up and down shift must be performed. That is, in such transmission, it is impossible to skip over a gear and shift from first to third or vice versa, for example.

In order to solve the drawback of such transmission, the applicant has previously proposed, in Japanese Patent Application First Publication No. 58-118355 (which has corresponding U.S. patent application Ser. No. 454,005) and Japanese Patent Application No. 58-169325, improved synchromesh type automatic transmissions. In these transmissions, it is possible to skip over gears and perform non-sequential up and down shifts when desired.

However, also these prior proposed transmissions have suffered from another drawback that the structure for bearing or rotatably supporting a given (that is, third speed) input gear is very complicated. That is, in the prior proposed arrangements, respective synchronizers must be arranged at either side of the "single" third speed input gear for connecting the gear with first and second intermediate shafts selectively. This arrangement makes the supporting structure for the third speed input gear complicated.

SUMMARY OF THE INVENTION

It is therefore an object of the present invention to provide a synchromesh type automatic transmission in which a simple structure is employed for supporting the third speed input gear (or gears) and in which it is possible to skip over gears and perform non-sequential up and down shifts when desired.

The present invention accordingly features a countershaft synchromesh type transmission which is arranged to have primary and secondary groups of intermeshing input and output gears which are designed to selectively provide between the input shaft and the countershaft a common third speed change ratio.

According to the present invention, there is provided a transmission which comprises an input shaft operatively connected with a source of rotational energy; a first intermediate shaft arranged to be coaxial with the input shaft: a first clutch for selectively providing a drive connection between the input shaft and the first intermediate shaft; a second intermediate shaft arranged to be coaxial with the input shaft; a second clutch for selectively providing a drive connection between the input shaft and the second intermediate shaft; a countershaft arranged to be parallel with the input shaft; a first group of intermeshing input and output gears associated with the first intermediate shaft and the countershaft, the first group gears being capable of providing between the first intermediate shaft and the countershaft a first predetermined number of speed change ratio; a second group of intermeshing input and output gears associated with the second intermediate shaft and the countershaft, the second group gears being capable of providing between the second intermediate shaft and the countershaft a second predetermined number of speed change ratio; output means associated with the countershaft to transmit the power applied to the countershaft to an external driven means; a primary group of gears which comprises a first input gear rotatably disposed about the first intermediate shaft and connectable with the same to rotate therewith when a synchronizer is practically applied therebetween, and a first output gear securely disposed on the countershaft and constantly meshed with the first input gear to rotate therewith; a secondary group of gears which comprises a second input gear rotatably disposed about the second intermediate shaft and connectable with the same to rotate therewith when a synchronizer is practically applied therebetween, and a second output gear securely disposed on the countershaft and constantly meshed with the second input gear to rotate therewith, wherein the primary and secondary group of gears are so constructed as to provide between the input shaft and the countershaft a common speed change ratio, selectively.

BRIEF DESCRIPTION OF THE DRAWINGS

Other objeots and advantages of the present invention will become apparent from the following description when taken in conjunction with the accompanying drawings, in which.

DETAILED DESCRIPTION OF THE PREFERRED EMBODIMENTS

Figure 1:
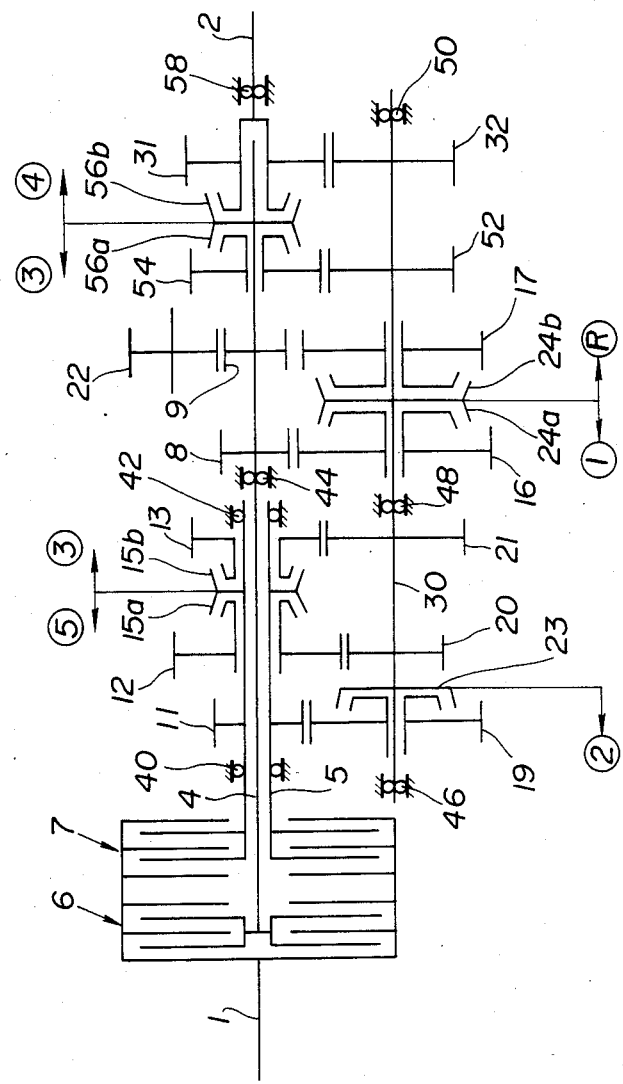
FIG. 1 is a schematic drawing of a first embodiment of the present invention.

Referring to FIG. 1, there is shown a first embodiment of the present invention, which is a transmission designed for "FR" (viz., front engine rear drive) type motor vehicle. The transmission shown takes the form of a five speed transmission (viz., a transmission having five forward speeds and one reverse).

In this first embodiment, an input shaft 1 and an output shaft 2 are arranged coaxially. The input shaft 1 is connected to a crankshaft (not shown) of the engine, while, the output shaft 2 is connected through a differential gear (not shown) to driven road wheels (not shown) of the vehicle. As shown, the input shaft 1 is connected with first and second clutches 6 and 7 which are positioned close to each other. The first clutch 6 is operative to selectively connect the input shaft 1 with a first intermediate shaft 4, while, the second clutch 7 is operative to selectively connect the input shaft 1 with a second intermediate shaft 5. The first and second intermediate shafts 4 and 5 are arranged to be coaxial with the input shaft 1. The second intermediate shaft 5 is of a tubular shaft through which the first intermediate shaft 4 passes coaxially. The first intermediate shaft 4 projects from the right end of the second intermediate shaft 5, as shown. The tubular second intermediate shaft 5 is rotatably supported by axially spaced two bearings 40 and 42 which are disposed in the transmission. The first intermediate shaft 4 is rotatably supported at the projecting portion thereof by a bearing 44 which is also disposed in the transmission.

A countershaft 30 is arranged to be parallel with the first and second intermediate shafts 4 and 5. Axially spaced three bearings 46, 48 and 50 are used for rotatably supporting the countershaft 30. The countershaft 30 is in drive connection with the output shaft 2 through a pair of gears 31 and 32 which are constantly meshed. The gear 31 is coaxially fixed to the output shaft 2, while, the gear 32 is coaxially fixed to the countershaft 30, as shown. The output shaft 2 is rotatably supported by a bearing 58. The countershaft 30 is provided with a second speed output gear 19, a fifth speed output gear 20, a secondary third speed output gear 21, a first speed output gear 16, a reverse output gear 17 and a primary third speed output gear 52 which are arranged in this order from the left portion of the countershaft 30 toward the right portion of the same, in the drawing. The fifth speed output gear 20, the secondary third speed output gear 21 and the primary third speed output gear 52 are secured to the countershaft 30 to rotate therewith. The second speed output gear 19 is rotatably disposed about the countershaft 30 and smoothly connectable with the countershaft 30 through a synchronizer 23, and the first speed output gear 16 and the reverse output gear 17 are rotatably disposed about the countershaft 30 and smoothly connectable with the countershaft 30 through respective synchronizers 24a and 24b.

The second speed output gear 19, the fifth speed output gear 20 and the secondary third speed output gear 21 are constantly and respectively meshed with a second speed input gear 11, a fifth speed input gear 12 and a secondary third speed input gear 13 which are coaxially disposed about the second intermediate shaft 5, as shown. That is, the second speed input gear 11 is secured to the second intermediate shaft 5 to rotate therewith, while, the fifth speed input gear 12 and the secondary third speed input gear 13 are rotatably disposed about the second intermediate shaft 5 and smoothly connectable with the second intermediate shaft 5 through respective synchronizers 15a and 15b.

The first speed output gear 16 and the primary third speed output gear 52 are constantly and respectively meshed with a first speed input gear 8 and a primary third speed input gear 54 which are coaxially disposed about the first intermediate shaft 4, as shown. That is, the first speed input gear 8 is secured to the first intermediate shaft 4 to rotate therewith, while, the primary third speed input gear 54 is rotatably disposed about the first intermediate shaft 4 and smoothly connectable with the same through a synchronizer 56a. The reverse output gear 17 is meshed with an idler gear 22 which is, in turn, meshed with a reverse input gear 9 which is secured to the first intermediate shaft 4.

The output shaft 2 is smoothly connectable with the first intermediate shaft 4 through a synchronizer 56b which is in cooperation with the above-mentioned synchronizer 56a.

The operation of this first embodiment is as follows:

(1) Neutral Position

When the first and second clutches 6 and 7 are both uncoupled, the power from the engine is completely shut off thereby causing the transmission to assume its neutral condition. Apart from this, if, even when either the first clutch 6 or second clutch 7 is coupled, all of the synchronizers 15a, 15b, 23, 24a, 24b, 56a and 56b assume their inoperative (or neutral) positions, the neutral condition of the transmission is also established.

(2) 1-2 Upshift

When the synchronizer 24a is moved to its operative position (that is, the position indicated by ① in FIG. 1) and the first clutch 6 is coupled, the first speed gear ratio is established. That is, in this condition, the power from the input shaft 1 is transmitted to the countershaft 30 through the first clutch 6, the first intermediate shaft 4, the first speed input gear 8, the first speed output gear 16 and the synchronizer 24a, and at the same time, the power thus transmitted to the countershaft 30 is transmitted to the output shaft 2 through the gears 32 and 31.

In preparation for a 1-2 upshift, the synchronizer 23 is moved to its operative position (that is, the position indicated by ② in FIG. 1) with the above-mentioned power transmission path remaining unchanged. With this operation, the second intermediate shaft 5 and the countershaft 30 are brought into drive connection with each other through the second speed input gear 11 and the second speed output gear 19. Then, the first clutch 6 is uncoupled and at the same time the second clutch 7 is coupled. This establishes a new power transmission path comprising the input shaft 1, the second clutch 7, the second intermediate shaft 5, the second speed input gear 11, the second speed output gear 19, the synchronizer 23, the countershaft 30, the gear 32, the gear 31 and the output shaft 2. Thus, the second speed gear ratio is established. It should be noted that this upshift is carried out by switching the coupling of the first clutch 6 to the second clutch 7 with the gears 8 and 16 of one group remaining in their first speed positions and with the gears 11 and 19 of the other group gears remaining in their second speed positions. That is to say, the upshift is carried out with the power output of the transmission remaining essentially uninterrupted.

Upon completion of switching of the coupling from the first clutch 6 to the second clutch 7, the synchronizer 24a is returned from its operative position to its neutral position.

(3) 2-3 Upshift

In preparation for a 2-3 upshift, the synchronizer 56a is moved to its operative position (that is, the position indicated by ③ in FIG. 1) with the synchronizer 23 remaining in its operative position. With this operation, the primary third speed input gear 54 is brought into drive connection with the first intermediate shaft 4. Then, the second clutch 7 is uncoupled and at the same time, the first clutch 6 is coupled. This establishes a new power transmission path comprising the input shaft 1, the first clutch 6, the first intermediate shaft 4, the synchronizer 56a, the primary third speed input gear 54, the secondary third speed output gear 52, the countershaft 30, the gear 32, the gear 31 and the output shaft 2. Thus, the third speed gear ratio is established in the transmission.

Upon completion of switching of the coupling from the second clutch 7 to the first clutch 6, the synchronizer 23 is returned from its operative position to its neutral position. Similar to the above-mentioned 1-2 shift case, the 2-3 upshift is carried out with the power output of the transmission remaining essentially uninterrupted.

(4) 3-4 Upshift

In preparation for a 3-4 upshift, the transmission carries out a switching from a primary third speed condition wherein the synchronizer 56a assumes its operative position to a secondary third speed condition wherein the synchronizer 15b assumes its operative position. That is, for such 3-4 upshift, the synchronizer 15b is moved to its operative position (that is, the position indicated by left-positioned ③ in FIG. 1), and the first clutch 6 is uncoupled and at the same time, the second clutch 7 is coupled. Then, the synchronizer 56a is returned from its operative position to its neutral position. With this operation, a new power transmission path is established which comprises the input shaft 1, the second clutch 7, the second intermediate shaft 5, the synchronizer 15b, the secondary third speed input gear 13, the secondary third speed output gear 21, the countershaft 30, the gear 32, the gear 31 and the output shaft 2. Thus, the third speed gear ratio by the secondary third speed condition of the transmission is established.

Then, the synchronizer 56b is moved to its operative position (that is, the position indicated by ④ in FIG. 1) thereby to connect the first intermediate shaft 4 with the output shaft 2. Then, the second clutch 7 is uncoupled and at the same time, the first clutch 6 is coupled. With this operation, a new power transmission path is established which comprises the input shaft 1, the first clutch 6, the first intermediate shaft 4, the synchronizer 56b and the output shaft 2. Thus, the fourth speed gear ratio is established.

Upon completion of uncoupling of the second clutch 7, the synchronizer 15b is returned from its operative position to its neutral position. Similar to the above-mentioned upshifts, the 3-4 upshift is carried out without any interruption of the power transmission.

(5) 4-5 Upshift

In preparation of a 4-5 upshift, the synchronizer 15a is moved to its operative position (that is, the position indicated by ⑤ in FIG. 1) thereby to connect the second intermediate shaft 5 with the fifth speed input gear 12. Then, the first clutch 6 is uncoupled and at the same time, the second clutch 7 is coupled. With this operation, a new power transmission path is established which comprises the input shaft 1, the second clutch 7, the second intermediate shaft 5, the synchronizer 15a, the fifth speed input gear 12, the fifth speed output gear 20, the countershaft 30, the gear 32, the gear 31 and the output shaft 2. Thus, the fifth speed gear ratio is established.

Upon completion of uncoupling of the first clutch 6, the synchronizer 56b is returned from its operative position to its neutral position. Similar to the above-mentioned shifts, the 4-5 upshift is carried out without any interruption of the power transmission.

(6) 5-4-3-2-1 Downshifts 5-4 downshift, 4-3 downshift, 3-2 downshift, and 2-1 downshift are accomplished by carrying out the reversed operations of the above-mentioned 4-5 upshift, 3-4 upshift, 2-3 upshift and 1-2 upshift. In these downshifts, any interruption of the power transmission does not occur.

(7) Reverse

In preparation for a reverse from the neutral position of the transmission, the synchronizer 24b is moved to its operative position (that is, the position indicated by ⓡ in FIG. 1) thereby to connect the reverse output gear 17 with the countershaft 30. Then, the first clutch 6 is coupled. With this, a power transmission path is established which comprises the input shaft 1, the first clutch 6, the first intermediate shaft 4, the reverse input gear 9, the reverse idler gear 22, the reverse output gear 17, the synchronizer 24b, the countershaft 30, the gear 32, the gear 31 and the output shaft 2. Thus, the reverse condition is established in the transmission.

(8) 1-3 Upshift, 3-1 Downshift

In preparation for a non-sequential shift, such as 1-3 upshift and 3-1 downshift, the following operation is carried out.

In the first speed condition, a power transmission path is established which comprises the input shaft 1, the first clutch 6, the first intermediate shaft 4, the first speed input gear 8, the first speed output gear 16, the synchronizer 24a and the output shaft 2. When, under this condition, the third speed gear ratio is required, the synchronizer 15b is first moved to its operative position (that is, the position indicated by ③ in FIG. 1) to connect the secondary third speed input gear 13 with the second intermediate shaft 5. Then, the first clutch 6 is uncoupled and at the same time, the second clutch 7 is coupled. With this operation, the 1-3 upshift is completed without any interruption of the power transmission.

The 3-1 downshift is carried out by reversing the operation of the above-mentioned 1-3 upshift. When, however, the 3-1 downshift is required when the transmission assumes the primary third speed condition wherein the first clutch 6 is coupled and the synchronizer 56a is in its operative position, operation for changing the primary third speed condition to the secondary third speed condition (wherein the second clutch 7 is coupled and the synchronizer 15b is in its operative position) is carried out before completing the 3-1 downshift. Thereafter, the second clutch 7 is uncoupled and at the same time, the first clutch 6 is coupled. With this, the 3-1 downshift is completed.

(9) 5-3 Downshift, 3-5 Upshift

In the fifth speed condition, a power transmission path is established which comprises the input shaft 1, the second clutch 7, the second intermediate shaft 5, the synchronizer 15a, the fifth speed input gear 12, the fifth speed output gear 20 and the output shaft 2. When, under this condition, the third speed gear ratio is required, the synchronizer 56a is moved to its operative position (that is, the position indicated by ③ in FIG. 1) to connect the first intermediate shaft 4 with the primary third speed input gear 54. Then, the second clutch 7 is uncoupled and at the same time, the first clutch 6 is coupled. With this operation, a power transmission path is established which comprises the input shaft 1, the first clutch 6, the first intermediate shaft 4, the synchronizer 56a, the primary third speed input gear 54, the primary third speed output gear 52 and the output shaft 2. Thus, the third speed gear ratio is established. Of course, this downshift is effected without any substantial interruption of the power transmission.

The 3-5 upshift is carried out by reversing the operation of the above-mentioned 5-3 downshift. When, however, the 3-5 upshift is required when the transmission assumes the secondary third speed condition wherein the second clutch 7 is coupled and the synchronizer 15b is in its operative position, operation for changing the condition to the primary third speed condition (wherein the first clutch 6 is coupled and the synchronizer 56a is in its operative position) is carried out before completing the upshift. Thereafter, the first clutch 6 is uncoupled and at the same time, the second clutch 7 is coupled. With this, the 3-5 upshift is completed.

(10) 2-4 Upshift, 4-2 Downshift

In the second speed condition, a power transmission path is established which comprises the input shaft 1, the second clutch 7, the second intermediate shaft 5, the second speed input gear 11, the second speed output gear 19, the synchronizer 23, the countershaft 30 and the output shaft 2. When, under this condition, the fourth speed gear ratio is required, the synchronizer 56b is moved to its operative position (that is, the position indicated by ④ in FIG. 1) with the above-mentioned power transmission path remaining unchanged. Then, the second clutch 7 is uncoupled and at the same time, the first clutch 6 is coupled. With this, the power is transmitted to the output shaft 2 through the first clutch 6, the first intermediate shaft 4 and the synchronizer 56b thereby to establish the fourth speed gear ratio. This upshift is thus carried out without any substantial interruption of the power transmission.

The 4–2 downshift is carried out by reversing the operation of the above-mentioned 2–4 upshift.

It is to be noted that the operation of the first and second clutches and the synchronizers can be carried out either hydraulically or electrically under either manual control or under the control of a computer controlled system for example.

Figure 2:
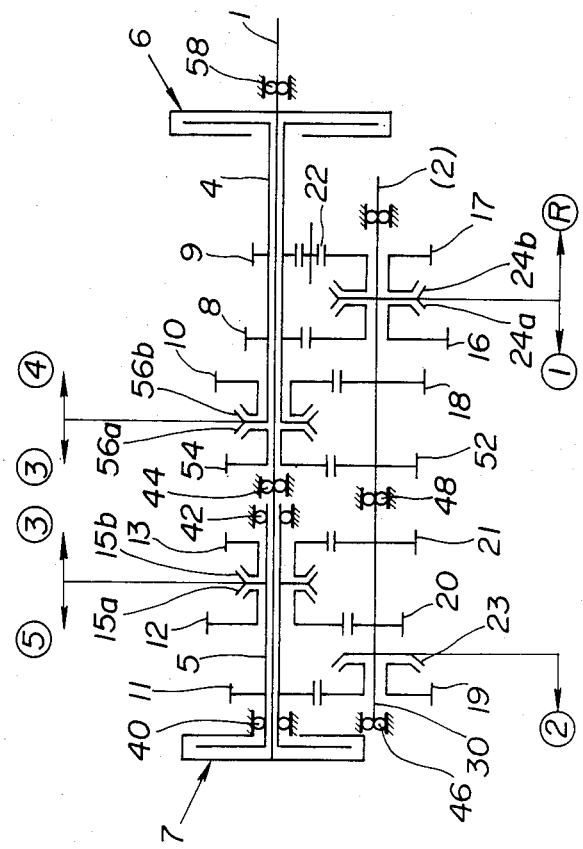
FIG. 2 is a schematic drawing of a second embodiment of the present invention.

Referring to FIG. 2, there is shown a second embodiment of the present invention, which is a five speed transmission designed for "FF" (viz., front engine front drive) type motor vehicle. Although the positional relationship between the parts is different from that shown in FIG. 1, the functional relationship between the parts is substantially the same as that of the first embodiment. Thus, the functionally identical parts to those of the first embodiment of FIG. 1 are designated by the same numerals.

In this second embodiment, both the first and second intermediate shaft 4 and 5 are of a tubular shaft, which are rotatably disposed about the input shaft 1 and axially spaced from each other, as shown. The input shaft 1 is connected at its both ends with first and second clutches 6 and 7 which are operative to selectively connect the input shaft 1 with the first and second intermediate shafts 4 and 5 respectively. The bearings 40 and 42 are used for rotatably supporting the second intermediate shaft 5, while, the bearings 44 and 58 are for the first intermediate shaft 4.

A countershaft 30 (that is, an output shaft 2 in this second embodiment) is arranged to be parallel with the input shaft 1. Three bearings 46, 48 and 50 are used for rotatably supporting the countershaft 30. The right end of the countershaft 30 is engaged with a final drive unit or the like (not shown). The countershaft 30 is provided with a second speed output gear 19, a fifth speed output gear 20, a secondary third speed output gear 21, a primary third speed output gear 52, a fourth speed output gear 18 (which is not provided in the first embodiment), a first speed output gear 16 and a reverse output gear 17 which are arranged in this order from the left portion of the countershaft 30 toward the right portion of the same in FIG. 2. The fifth speed output gear 20, the secondary third speed output gear 21, the primary third speed output gear 52 and the fourth speed output gear 18 are secured to the countershaft 30 to rotate therewith. The second speed output gear 19 is rotatably disposed about the countershaft 30 and smoothly connectable with the same through a synchronizer 23, and the first speed output gear 16 and the reverse output gear 17 are rotatably disposed about the countershaft 30 and smoothly connectable with the same through respective synchronizers 24a and 24b.

The second speed output gear 19, the fifth speed output gear 20 and the secondary third speed output gear 21 are constantly meshed with a second speed input gear 11, a fifth speed input gear 12 and a secondary third speed input gear 13 which are disposed about the tubular second intermediate shaft 5, as shown. That is, the second speed input gear 11 is secured to the second intermediate shaft 5 to rotate therewith, while, the fifth speed input gear 12 and the secondary third speed input gear 13 are rotatably disposed about the second intermediate shaft 5 and smoothly connectable with the same through respective synchronizers 15a and 15b.

The primary third speed output gear 52, the fourth speed output gear 18 and the first speed output gear 16 are constantly meshed with a primary third speed input gear 54, a fourth speed input gear 10 (which is not provided in the first embodiment) and a first speed input gear 8 which are disposed about the tubular first intermediate shaft 4. That is, the primary third speed input gear 54 and the fourth speed input gear 10 are rotatably disposed about the first intermediate shaft 4 and smoothly connectable with the same through respective synchronizers 56a and 56b. The reverse output gear 17 is meshed with a reverse idler gear 22 which is, in turn, meshed with a reverse input gear 9 which is secured to the first intermediate shaft 4, as shown.

As will be seen from the above description, the arrangement of the second embodiment is substantially the same as that of the first embodiment except for several parts. That is, in the second embodiment, the first clutch 6 and the second clutch 7 are located away from each other, the first intermediate shaft 4 is also of a tubular shaft through which the input shaft 1 passes axially, parts corresponding to the output shaft 2 and the input and output gears 31 and 32 of the first embodiment are not provided because the countershaft 30 can serve as an output shaft (2), and a fourth speed output gear 18 and a fourth speed input gear 10 are provided.

The operation of the second embodiment is as follows:

(1) Neutral Position

When the first and second clutches 6 and 7 are both uncoupled, the power from the engine is completely shut off thereby causing the transmission to assume its neutral position. Similar to the case of the first embodiment, if all of the synchronizers 15a, 15b, 23, 24a, 24b, 56a and 56b are in their inoperative (or neutral) positions, the neutral condition of the transmission is also established even when either the first clutch 6 or second clutch 7 is coupled.

(2) 1–2 Upshift

When the synchronizer 24a is moved to its operative position (that is, the position indicated by ① in FIG. 1) and the first clutch 6 is coupled, the first speed gear ratio is established. That is, in this condition, a power transmission path is provided which comprises the input shaft 1, the first clutch 6, the first speed input gear 8, the first speed output gear 16, the synchronizer 24a and the countershaft 30 (output shaft 2).

For preparing a 1–2 upshift, the synchronizer 23 is moved to its operative position (that is, the position indicated by ② in FIG. 2) with the above-mentioned power transmission path remaining unchanged. With this operation, the tubular second intermediate shaft 5 is brought into drive connection with the countershaft 30 through the constantly meshed second speed input and output gears 11 and 19. Then, the first clutch 6 is uncoupled and at the same time, the second clutch 7 is coupled. This establishes a new power transmission path which comprises the input shaft 1, the second clutch 7, the second speed input gear 11, the second speed output gear 19, the synchronizer 23 and the countershaft 3 (output shaft 2). Thus, the second speed gear ratio is established. For the same reasons as is described in the first embodiment, this 1-2 upshift is carried out with the power output of the transmission essentially uninterrupted.

Upon completion of switching of the coupling from the first clutch 6 to the second clutch 7, the synchronizer 24a is returned from its operative position to its neutral (or inoperative) position.

(3) 2-3 Upshift

In preparation for a 2-3 upshift, the synchronizer 56a is moved to its operative position (that is, the position indicated by ③ in FIG. 2) with the synchronizer 23 remaining in its operative position. With this operation, the primary third speed input gear 54 is brought into drive connection with the first intermediate shaft 4. Then, the second clutch 7 is uncoupled and at the same time, the first clutch 6 is coupled. This establishes a new power transmission path comprising the input shaft 1, the first clutch 6, the first intermediate shaft 4, the synchronizer 56a, the primary third speed input gear 54, the primary third speed output gear 52 and the countershaft 30 (or output shaft 2). Thus, the third speed gear ratio is established in the transmission.

Upon completion of switching of the coupling from the second clutch 7 to the first clutch 6, the synchronizer 23 is returned from its operative position to its neutral position. This 2-3 upshift is carried out without any substantial interruption of the power transmission.

(4) 3-4 Upshift

For preparing a 3-4 upshift, the transmission carries out a switching from a primary third speed condition wherein the synchronizer 56a for the primary third speed input gear 54 assumes its operative position to a secondary third speed condition wherein the synchronizer 15b for the secondary third speed input gear 13 assumes its operative position. That is, for such upshift, the synchronizer 15b is moved to its operative position (that is, the position indicated by ③ in FIG. 2), and the first clutch 6 is uncoupled and at the same time, the second clutch 7 is coupled. Then, the synchronizer 56a is returned from its operative position to its neutral position. With this operation, a new power transmission path is established which comprises the input shaft 1, the second clutch 7, the second intermediate shaft 5, the synchronizer 15b, the secondary third speed input gear 13, the secondary third speed output gear 21 and the countershaft 30 (output shaft 2). Thus, the third speed gear ratio by the secondary third speed condition is established.

Then, the synchronizer 56b is moved to its operative position (that is, the position indicated by ④ in FIG. 2) to connect the fourth speed input gear 10 to the first intermediate shaft 4. Then, the second clutch 7 is uncoupled and at the same time, the first clutch 6 is coupled. With this operation, a new power transmission path is provided which comprises the input shaft 1, the first clutch 6, the first intermediate shaft 4, the synchronizer 56b, the fourth speed input gear 10, the fourth speed output gear 18 and the countershaft 30 (output shaft 2). Thus, the fourth speed gear ratio is established in the transmission.

Upon completion of switching of the coupling from the second clutch 7 to the first clutch 6, the synchronizer 15b is returned from its operative position to its neutral position. Similar to the above-mentioned upshifts, this 3-4 upshift is also carried out without any substantial interruption of the power transmission.

(5) 4-5 Upshift

In preparation for a 4-5 upshift, the synchronizer 15a is moved to its operative position (that is, the position indicated by ⑤ in FIG. 2) thereby to connect the second intermediate shaft 5 with the fifth speed input gear 12. Then, the first clutch 6 is uncoupled and at the same time, the second clutch 7 is coupled. With this operation, a new power transmission path is provided which comprises the input shaft 1, the second clutch 7, the second intermediate shaft 5, the synchronizer 15a, the fifth speed input gear 12, the fifth speed output gear 20 and the countershaft 30 (or output shaft 2). Thus, the fifth speed gear ratio is established in the transmission.

Upon completion of switching of the coupling from the first clutch 6 to the second clutch 7, the synchronizer 56b is returned from its operative position to its operative position. The 4-5 upshift is thus carried out without any substantial interruption of the power transmission.

(6) 5-4-3-2-1 Downshifts

These downshifts are accomplished by essentially reversing the operations carried out in the above-mentioned upshifts. In these downshifts, any interruption of the power transmission does not occur.

(7) Reverse

In preparation of the reverse from the neutral position of the transmission, the synchronizer 24b is moved to its operative position (that is, the position indicated by ⓡ in FIG. 2) thereby to connect the reverse output gear 17 with the countershaft 30 (output shaft 2). Then, the first clutch 6 is coupled. With this, a power transmission path is provided which comprises the input shaft 1, the first clutch 6, the first intermediate shaft 4, the reverse input gear 9, the reverse idler gear 22, the reverse output gear 17, the synchronizer 24b and the countershaft 30 (output shaft 2). Thus, the reverse condition is established in the transmission.

(8) 1-3 Upshift, 3-1 Downshift

In preparation for non-sequential shift 1, such as 1-3 upshift and 3-1 downshift, the following operation is carried out.

As is described hereinabove, in the first speed gear ratio, the transmission establishes a power transmission path which comprises the input shaft 1, the first clutch 6, the first intermediate shaft 4, the first speed input gear 8, the first speed output gear 16, the synchronizer 24a and the countershaft 30 (output shaft 2). When, under this condition, the third speed gear ratio is required, the synchronizer 15b is moved to its operative position to connect the secondary third speed input gear 13 with the second intermediate shaft 5. Then, the first clutch 6 is uncoupled and at the same time, the second clutch 7 is coupled. With this operation, the 1-3 upshift is completed.

The 3-1 downshift is carried out by reversing the operation of the above-mentioned 1-3 upshift. When, however, the 3-1 downshift is required when the transmission assumes the primary third speed condition wherein the first clutch 6 is coupled and the synchronizer 56a is in its operative position, operation for changing the primary third speed condition to the secondary third speed condition (wherein the second clutch 7 is coupled and the synchronizer 15b is in its operative position) is carried out before completing the 3–1 downshift. Thereafter, the second clutch 7 is uncoupled and at the same time, the first clutch 6 is coupled. With this, the 3–1 downshift is completed.

(9) 5–3 Downshift, 3–5 Upshift

In the fifth speed gear ratio, a power transmission path is provided which comprises the input shaft 1, the second clutch 7, the second intermediate shaft 5, the synchronizer 15a, the fifth speed input gear 12, the fifth speed output gear 20 and the countershaft 30 (or output shaft 2). When, under this condition, the third speed gear ratio is required, the synchronizer 56a is moved to its operative position to connect the first intermediate shaft 4 with the primary third speed input gear 54. Then, the second clutch 7 is uncoupled and at the same time, the first clutch 6 is coupled. With this, the primary third speed condition is provided in the transmission. This 5–3 downshift is carried out without any substantial interruption of the power transmission.

The 3–5 upshift is carried out by reversing the operation of the above-mentioned 5–3 downshift. When, however, the 3–5 upshift is required when the transmission assumes the secondary third speed condition wherein the second clutch 7 is coupled and the synchronizer 15b is in its operative position, operation for switching the third speed condition to the primary third speed condition (wherein the first clutch 6 is coupled and the synchronizer 56a is in its operative position) is carried out before completing the 3–5 upshift. Thereafter, the first clutch 6 is uncoupled and at the same time, the second clutch 7 is coupled. With this, the 3–5 upshift is completed.

(10) 2–4 Upshift, 4–2 Downshift

In the second speed gear ratio, a power transmission path is established which comprises the input shaft 1, the second clutch 7, the second speed input gear 11, the second speed output gear 19, the synchronizer 23 and the countershaft 30 (output shaft 2). When, under this condition, the fourth speed gear ratio is required, the synchronizer 56b is moved to its operative position with the above-mentioned second speed power transmission path remaining unchanged. Then, the second clutch 7 is uncoupled and at the same time, the first clutch 6 is coupled. With this, the 2–4 upshift is completed.

The 4–2 downshift is carried out by reversing the operation of the above-mentioned 2–4 upshift.

As will be apparent from the foregoing description, in the synchromesh type automatic transmission according to the present invention, the non-sequential shift is available without any substantial interruption of the power transmission. Furthermore, since two groups of mechanisms (which are the primary group comprising the gears 54 and 52 and the synchronizer 56a and the secondary group comprising the gears 13 and 21 and the synchronizer 15b) are employed and alternately operative for establishing a common third speed gear ratio of the transmission, the structure for rotatably supporting each input gear 54 or 13 with which the synchronizer 56a or 15b is associated is simple in construction. That is, in the invention, the third speed input gear 54 or 13 is arranged to be incorporated with "only" one synchronizer 56a or 15b unlike the case of the aforementioned previously proposed transmissions.

Although the foregoing description is directed to the five forward speed transmission, the present invention can be also applied to a four or three speed transmission. In the four speed transmission, the fifth speed input and output gears 12 and 20 and their associated synchronizer 15a may be removed, and in the three speed transmission, the first speed input and output gears 8 and 16 and their associated synchronizer 24a may be removed. The three speed transmission can be also provided by removing only the synchronizer 56b.

What is claimed is:

1. A transmission comprising:
   an input shaft operatively connected with a source of rotational energy;
   a first intermediate shaft arranged to be coaxial with said input shaft;
   a first clutch for selectively providing a drive connection between said input shaft and said first intermediate shaft;
   a second intermediate shaft arranged to be coaxial with said input shaft;
   a second clutch for selectively providing a drive connection between said input shaft and said second intermediate shaft;
   a countershaft arranged to be parallel with said input shaft;
   a first group of intermeshing input and output gears arranged between said first intermediate shaft and said countershaft to provide a first predetermined speed change ratio;
   a second group of intermeshing input and output gears arranged between said second intermediate shaft and said countershaft to provide a second predetermined speed change ratio;
   output means for connection with said countershaft to transmit power from the countershaft to an external drive means;
   a primary means which comprises a first input gear rotatably disposed about said first intermediate shaft, a first synchronizer-clutch arranged between said first input gear and said first intermediate intermediate shaft to selectively connect and disconnect said first input gear and said first intermediate shaft and a first output gear secured to said countershaft and constantly meshed with said first input gear to rotate therewith;
   a secondary means which comprises a second input gear rotatably disposed about said second intermediate shaft, a second synchronizer-clutch arranged between said second input gear and said intermediate shaft to selectively connect and disconnect said second input gear and said second intermediate shaft and a second output gear secured to said countershaft and constantly meshed with said second input gear to rotate therewith,
   wherein said primary and secondary means are constructed to individually provide between said input shaft and said countershaft a common speed change ratio.

2. A transmission as claimed in claim 1, further comprising a third group of intermeshing input, idler and output gears associated with either one of said first and second intermediate shafts and said countershaft, the third group gears being capable of providing between the selected intermediate shaft and said countershaft a third predetermined number of speed change ratio.

3. A transmission as claimed in claim 1, in which said output means comprises an output shaft which is arranged to be coaxial with said input shaft and is connectable to said countershaft through a pair of intermeshing gears which are included in said first group of gears.

4. A transmission as claimed in claim 2, in which each of said first, second and third groups of gears has a synchronizer which provides a smooth drive connection between the associated intermediate shaft and said countershaft when actuated.

5. A transmission as claimed in claim 4, in which the gears of said first group are selected so that the speed change ratios produced by any two paired gears are the first and fourth of a series of five consecutive speed change ratios, and in which the gears of said second group are selected so that the speed change ratios produced by any two paired gears are the second and fifth of said series.

6. A transmission as claimed in claim 5, in which the paired input and output gears of each of said primary and secondary means are so selected as to produce the third of the series of said five consecutive speed change ratios.

7. A transmission as claimed in claim 6, in which the synchronizers for providing the first and second of the series of five consecutive speed change ratios are arranged to operatively engage with said countershaft, and the synchronizers for providing the fourth and fifth of said series are arranged to operatively engage with said first and second intermediate shafts, respectively.

8. A transmission as claimed in Claim 7, in which the synchronizers of said primary and secondary means are arranged to operatively engage with said first and second intermediate shafts, respectively.

9. A transmission as claimed in claim 8, in which said first and second clutches are arranged close to each other, and in which said second intermediate shaft is of a tubular shaft through which said first intermediate shaft passes axially.

10. A transmission as claimed in claim 8, in which said first and second clutches are coaxially arranged tubular shafts through which said input shaft passes axially.

* * * * *